May 17, 1938. C. J. HILLMAN 2,117,322
SHOCK ABSORBER FOR FISHING LINES
Filed July 17, 1937
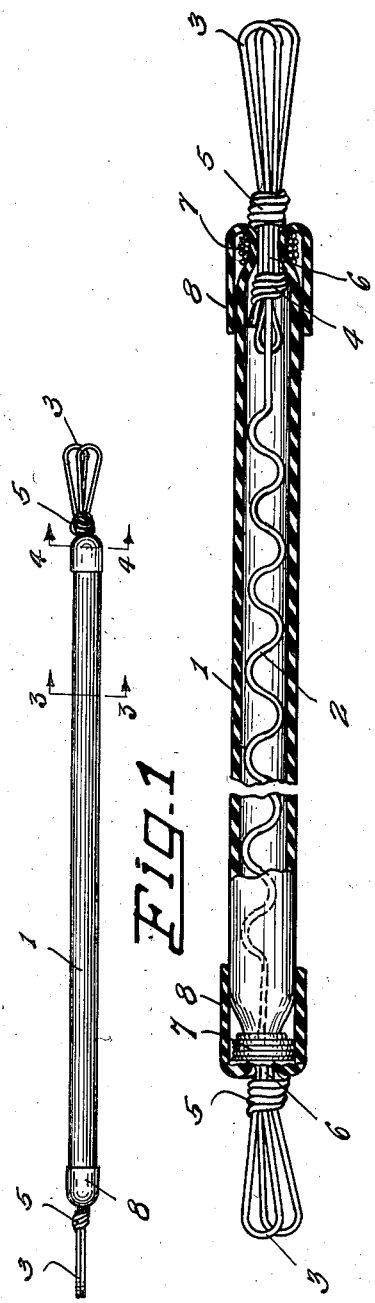
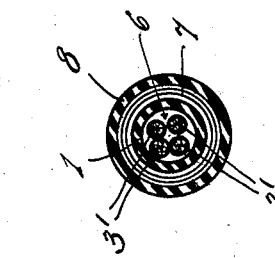
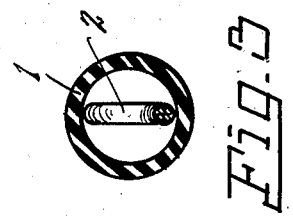
Inventor
Carl J. Hillman
By
Attorney Patented May 17, 1938

2,117,322

UNITED STATES PATENT OFFICE 2,117,322

SHOCK ABSORBER FOR FISHING LINES

Carl J. Hillman, Spokane, Wash.

Application July 17, 1937, Serial No. 154,289

2 Claims. (Cl. 267—69)

This invention relates to a shock absorber for fishing lines, and it is one object of the invention to provide a device of this character adapted to be installed between a line and the leader of a hook and serve to absorb shocks caused when a fish takes the bait and exerts pull or sudden jerks as it attempts to escape from the hook.

Another object of the invention is to so form the shock absorber that a portion of a line forming the same will be housed in an elastic tube of appreciably less length than the portion of the line housed therein, thus permitting the elastic tube to be stretched to a considerable extent by pull of a fish and retract when relieved from the strain.

Another object of the invention is to provide an improved arrangement of knots for forming loops at ends of the line forming part of the shock absorber, the knots being so arranged that ends of the elastic tube may each be secured between a pair of knots and the ends of the tube prevented from slipping out of their proper positions relative to the line and the loops thereof.

Another object of the invention is to so secure ends of the tube that tight closures will be formed and water prevented from entering the tube and causing the portion of the line within the tube to rot.

The invention is illustrated in the accompanying drawing, wherein

Figure 1 is a side elevation of the shock absorber.

Figure 2 is a sectional view taken longitudinally through the same.

Figure 3 is a sectional view taken along the line 3—3 of Figure 1.

Figure 4 is a sectional view taken along the line 4—4 of Figure 1.

The improved shock absorber is intended to be used between a fishing line and the leader of a hook or artificial bait. The shock absorber consists, briefly, of an elastic tube 1 formed of rubber and a line 2 of appreciably greater length than the tube and formed with eyes 3 at its ends which project from opposite ends of the tube. The portion of the line which is housed within the tube is of greater length than the tube and is crinkled, as shown in Figure 2, the length of this portion of the line when extended being substantially the length of the tube when the tube is stretched its full extent. It will thus be seen that when the shock absorber is in use and pull exerted, elasticity of the tube will not be impeded and the tube can be stretched its full extent and then contract as the pulling force is relieved.

The loops 3 are of duplicate construction and each is formed of an end portion of the line 2. In order to form a loop, an end portion of the line is doubled back upon itself and the doubled line then again folded back upon itself to provide a double loop, as shown in Figure 2. This will impart extra strength to the loop and prevent it from breaking easily when a fish line or leader is tied through the loop. The redoubled portion of the line has four strands, as shown at 3' in Figure 4, and in order to secure this portion of the line in loop-forming formation there have been provided knots 4 and 5 spaced from each other longitudinally of the shank portion 6 of the loop.

Binding threads 7 are wrapped tightly about end portions of the tube to firmly secure the same about the shanks 6 of the loops between the knots 4 and 5 so that the knots serve as abutments to prevent slippage and a water-proof cement is preferably applied to the shanks so that water will be prevented from seeping into the tube and causing the line to rot. After the bindings 7 have been applied, additional water proof cement may be applied to them to prevent rotting, or the threads may be moistened with the cement before being wrapped about the tube. The bindings are spaced from ends of the tube and the extended ends of the tube are folded back to form cuffs or sleeves 8 which are cemented into place to protect the bindings.

During manufacture of the shock absorber one end portion of the line is formed into a loop and the tube then secured about the shank of this loop with the line extending through the tube. The looped end of the line and secured end of the tube are then engaged with a suitable holding means and the tube stretched to its full extent and the protruding portion of the line formed into the second loop. This will assure proper length of line within the tube. The second end of the tube can then be secured about the shank of the second loop while holding the tube in an extended condition and when the tube is released and allowed to contract the portion of the line within the tube will be crinkled in a natural manner which will permit it to be easily extended without tangling when the tube is again stretched.

When the shock absorber is in use, the loop at one end is connected with the fish line by having the line tied through it and the leader is tied through the loop at the other end of the shock absorber. Therefore, the shock absorber will be disposed between the fishing line and the leader carrying the hook or artificial bait. When a fish takes the bait and is caught by the hook, pull exerted by the fish in endeavoring to escape will stretch the tube and the line and leader will be relieved from strain which might cause them to break. It will thus be seen that if a fish larger than those for which the fishing line is made should take the bait danger of losing the fish due to the line breaking will be eliminated. If the tube should snap due to extra strain, the line will remain intact and loss of the fish and leader will be prevented. The fact that ends of the tube are secured between the spaced knots prevents the loops from being pulled from the tube.

Having thus described the invention, what is claimed as new is:

1. A shock absorber for a fishing line comprising a tube of elastic material, a line extending through said tube in a crinkled condition, end portions of the line being formed into loops each having knots spaced from each other longitudinally of the shank, bindings compressing portions of the tube about the shanks of the loops between the knots, and ends of the tube being turned back to form sleeves enclosing the bound end portions of the tube and serving as shields for the bindings.

2. A shock absorber for a fishing line comprising a tube of elastic material, a line extending through said tube in a crinkled condition, end portions of the line being doubled and redoubled to form loops each of a multiple formation and provided with a shank consisting of a plurality of strands, the shank of each loop being formed with knots spaced from each other longitudinally of the shank, the shanks of the loops being disposed within end portions of the tube, and bindings holding the end portions of the tube tightly about the shanks between the knots, extremities of the tube being turned back over the binding to expose the outer knots and provide sleeves serving as shields for the bindings.

CARL J. HILLMAN.